Patented Aug. 23, 1938

2,127,843

UNITED STATES PATENT OFFICE 2,127,843

CASEIN COMPOSITION

Carl Iddings, Staten Island, N. Y., assignor to The Muralo Company, Inc., a corporation of New York No Drawing. Application August 30, 1935, Serial No. 38,666

4 Claims. (Cl. 134—12)

Recent work in the preparation of casein solutions has called for higher treating temperatures than formerly employed. While these elevated temperatures have in some cases resulted in stabilization of the solutions so produced, there has also been a tendency to darken the products, imparting to them a somewhat buff color.

This darkening effect is also encountered when ammonia is present in appreciable proportions, and becomes strongly evident where both heat and ammonia are employed in the preparation of the solutions. The effects become even more marked when the solution is slightly alkaline.

In general, it has been found that temperatures above 170° F., pH values exceeding 7.0 and the presence of ammonia, individually or collectively, tend to darken the solution and/or dispersion of casein under production. The extent of such darkening will depend upon which factors are present and their severity. In some cases where all three of these influences have been present, the solutions have been noted to darken so appreciably as to acquire a grayish-blue color.

Since it has been found that the effects of high temperatures, ammonia and alkalinity upon casein solutions are often highly desirable, it is proposed by the present invention to overcome the undesirable darkening caused thereby.

By incorporating into such casein solutions and/or dispersions, suitable quantities of sodium perborate, the same pale color is attained as would have been realized had mild conditions attended the dissolution and had no darkening occurred. It should be understood that while the use of sodium perborate does not result in a pure white solution, the solution does develop a very light aspect and where an adequate addition is made, the solution may become pale cream in color.

Because sodium perborate possesses a definitely alkaline reaction, its addition to a casein solution which was acid at the outset, not only overcomes the darkening or bleaches, but simultaneously renders the solution alkaline or reduces its acidity. When a casein solution has been prepared with fluorides such as those of the alkali metals and/or ammonia and possesses a pH value of 6.3 for example, by the addition of 2½%, for example, of sodium perborate, it may be simultaneously bleached to a pale color and assume a pH value of about 7.7.

Whereas hydrogen peroxide also serves as a bleaching agent for these casein solutions, it fails to render such solutions alkaline and is accordingly not as highly desirable as is sodium perborate.

The sodium perborate may be added to the particular casein solution in any convenient form. It may, for example, be stirred in as a powder or be mixed with pigments, etc., and added to the casein solution at the time that a paste paint is being compounded. It is essential however, that the addition be made at or about ordinary working temperatures, since it has been found that when the casein solution is warm or hot, the decomposition of the sodium perborate is so rapid that the liberated oxygen lacks sufficient time to become distributed throughout the solution, and as a consequence, little bleaching effect is experienced. When the material has been incorporated in a paint, the whiteness or light reflectance is improved by from 2 to 3% over that noted where sodium perborate was not used. These light reflectance values are based upon magnesium oxide as a standard at 100%.

For purposes of comparison, two examples of paints and their respective light reflectance values are given, differing in composition principally by the presence of sodium perborate.

|  | Example A | Example B |
|---|---|---|
| Vehicle | 42.00 parts | 42.00 parts |
| Lithopone | 38.00 parts | 38.00 parts |
| Talc | 15.00 parts | 13.95 parts |
| Clay | 5.00 parts | 5.00 parts |
| Sodium perborate |  | 1.05 parts |
| Light reflectance of paint-outs, MgO standard at 100% | 85.8% | 87.4% |

The bleaching effect may be employed to improve casein solutions whether intended for paints or other purposes, and is preferably accompanied by the attendant increase in pH value such as is produced when sodium perborate is used. When used in small amounts, the perborate might fail to raise the pH value of a solution to the alkaline range, even though an increase is noted while on the other hand, if a solution is already alkaline, the effect would be an increase in alkalinity. It may be introduced as a powder or in solution and its proportions are not to be limited, except by the requirements of a particular casein composition.

In view of the fact that a number of the casein solutions are made stable by virtue of some of those same influences that produce the objectionable darkening, it is of importance that the use of sodium perborate, a highly active reagent in the presence of water, does not impair the stability of such a solution, with the result that it is possible by the present invention to produce a casein solution characterized by its stability and undiminished viscosity over long periods of time, which is simultaneously light in color.

In the accompanying claims, "casein solution" is meant to include a solution and/or dispersion of casein.

I claim:

1. The method of improving a casein solution characterized by its stability and substantially undiminished viscosity over long periods of time comprising treating the same at temperatures exceeding approximately 170° F. and subsequently subjecting said solution to the action of sodium perborate at a relatively reduced temperature to produce an improved color.

2. The method of improving a casein solution characterized by its stability and substantially undiminished viscosity over long periods of time comprising treating the same at temperatures exceeding approximately 170° F. and subsequently simultaneously bleaching and adjusting the pH value of said solution by the addition thereto of sodium perborate at a relatively reduced temperature to produce an improved color.

3. The method of preparing a casein solution characterized by its stability and substantially undiminished viscosity over long periods of time comprising treating a casein solution at a temperature exceeding 170° F. and subsequently subjecting the solution to the action of sodium perborate at a relatively reduced temperature to produce an improved color.

4. The method of improving the color of a casein solution characterized by its stability and substantially undiminished viscosity over long periods of time comprising subjecting said solution to the action of sodium perborate and thereby bleaching and increasing the pH value of said solution while retaining the stability characteristics of the solution.

CARL IDDINGS.